US008996932B2

(12) United States Patent
Singh et al.

(10) Patent No.: US 8,996,932 B2
(45) Date of Patent: Mar. 31, 2015

(54) CLOUD MANAGEMENT USING A COMPONENT HEALTH MODEL

(71) Applicant: Microsoft Corporation, Redmond, WA (US)

(72) Inventors: Abhishek Singh, Redmond, WA (US); Srikanth Raghavan, Sammamish, WA (US); Ajay Mani, Woodinville, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 13/737,469

(22) Filed: Jan. 9, 2013

(65) Prior Publication Data

US 2014/0195853 A1    Jul. 10, 2014

(51) Int. Cl.
*G06F 11/00* (2006.01)
*G06F 11/22* (2006.01)

(52) U.S. Cl.
CPC .................... *G06F 11/2294* (2013.01)
USPC .......................................... 714/57; 714/47.3

(58) Field of Classification Search
None
See application file for complete search history.

(56) References Cited

U.S. PATENT DOCUMENTS

| | | | | |
|---|---|---|---|---|
| 6,463,343 | B1 * | 10/2002 | Emens et al. | 700/83 |
| 2002/0184555 | A1 * | 12/2002 | Wong et al. | 714/4 |
| 2004/0210889 | A1 * | 10/2004 | Childress et al. | 717/168 |
| 2006/0101308 | A1 * | 5/2006 | Agarwal et al. | 714/25 |
| 2006/0232927 | A1 * | 10/2006 | Vinberg et al. | 361/687 |
| 2009/0006069 | A1 * | 1/2009 | Alam et al. | 703/22 |
| 2009/0172461 | A1 * | 7/2009 | Bobak et al. | 714/2 |
| 2009/0290249 | A1 * | 11/2009 | Makino et al. | 360/31 |
| 2010/0070807 | A1 * | 3/2010 | Hamilton et al. | 714/48 |
| 2010/0185961 | A1 * | 7/2010 | Fisher et al. | 715/760 |
| 2010/0306408 | A1 | 12/2010 | Greenberg et al. | |
| 2011/0126197 | A1 | 5/2011 | Larsen et al. | |
| 2011/0289440 | A1 * | 11/2011 | Carter et al. | 715/771 |
| 2011/0289474 | A1 | 11/2011 | Sukhenko et al. | |
| 2011/0314339 | A1 | 12/2011 | Daily et al. | |
| 2012/0023432 | A1 * | 1/2012 | Aguren | 715/772 |
| 2012/0030122 | A1 | 2/2012 | Rahaman et al. | |
| 2012/0054332 | A1 | 3/2012 | Sahu et al. | |
| 2012/0066769 | A1 | 3/2012 | Latchem et al. | |
| 2013/0050246 | A1 * | 2/2013 | Barry et al. | 345/593 |
| 2013/0086411 | A1 * | 4/2013 | Bauer et al. | 714/3 |

OTHER PUBLICATIONS

"Redefining Software Development in Healthcare Information Technology the Role of Agile ALM, Cloud and Open Source", Retrieved on: Jan. 11, 2012, Available at: http://www.open.collab.net/media/pdfs/CollabNetWP_Agile%20ALM_HealthcareIT_2010.pdf.

* cited by examiner

*Primary Examiner* — Gabriel Chu
(74) *Attorney, Agent, or Firm* — Ben Tabor; David Andrews; Micky Minhas (57) ABSTRACT

Embodiments are directed to establishing a model for testing cloud components and to preventing cascading failures in cloud components. In one scenario, a computer system models identified cloud components (including cloud hardware components and/or cloud software components) as health entities. Each health entity is configured to provide state information about the cloud component. The computer system establishes declarative safety conditions which declaratively describe cloud computing conditions that are to be maintained at the identified cloud components. The computer system then tests against the declarative safety conditions to determine which cloud components are or are becoming problematic. Upon determining that an error has occurred, the computer system notifies users of the error and the component at which the error occurred. Guarded interfaces are established to ensure that actions taken to fix the error do not cause further failures.

16 Claims, 4 Drawing Sheets

CLOUD MANAGEMENT USING A COMPONENT HEALTH MODEL

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are for distribution over a plurality of computing systems. Such applications are typically referred to as cloud-based applications. Cloud-based applications may include many different components, each of which may be run on another cloud node (whether it be a hardware node or a virtual node). As such, cloud-based applications may be exposed to an increased number of failure points across the different cloud nodes.

BRIEF SUMMARY

Embodiments described herein are directed to establishing a model for testing cloud components and to preventing cascading failures in cloud components. In one embodiment, a computer system models identified cloud components (including cloud hardware components and/or cloud software components) as health entities. Each health entity is configured to provide state information about the cloud component. The computer system establishes declarative safety conditions which declaratively describe cloud computing conditions that are to be maintained at the identified cloud components. The computer system then tests against the declarative safety conditions to determine which cloud components are or are becoming problematic.

In another embodiment, a computer system prevents cascading failures in cloud components by first establishing declarative safety conditions which declaratively describe cloud computing conditions that are to be maintained at cloud components, including hardware components and/or software components. The computer system detects that at least one of the declarative safety conditions is no longer being met, indicating that an error has occurred at one or more components of a specified cloud. The computer system then determines, based on which safety condition is no longer being met, where the error occurred within the specified cloud and sends a notification to various users indicating that the error occurred. The notification also indicates the cloud component at which the error occurred.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to establishing a model for testing cloud components and to preventing cascading failures in cloud components. In one embodiment, a computer system models identified cloud components (including cloud hardware components and/or cloud software components) as health entities. Each health entity is configured to provide state information about the cloud component. The computer system establishes declarative safety conditions which declaratively describe cloud computing conditions that are to be maintained at the identified cloud components. The computer system then tests against the declarative safety conditions to determine which cloud components are or are becoming problematic.

In another embodiment, a computer system prevents cascading failures in cloud components by first establishing declarative safety conditions which declaratively describe cloud computing conditions that are to be maintained at cloud components, including hardware components and/or software components. The computer system detects that at least one of the declarative safety conditions is no longer being met, indicating that an error has occurred at one or more components of a specified cloud. The computer system then determines, based on which safety condition is no longer being met, where the error occurred within the specified cloud and sends a notification to various users indicating that the error occurred. The notification also indicates the cloud component at which the error occurred.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below.

Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
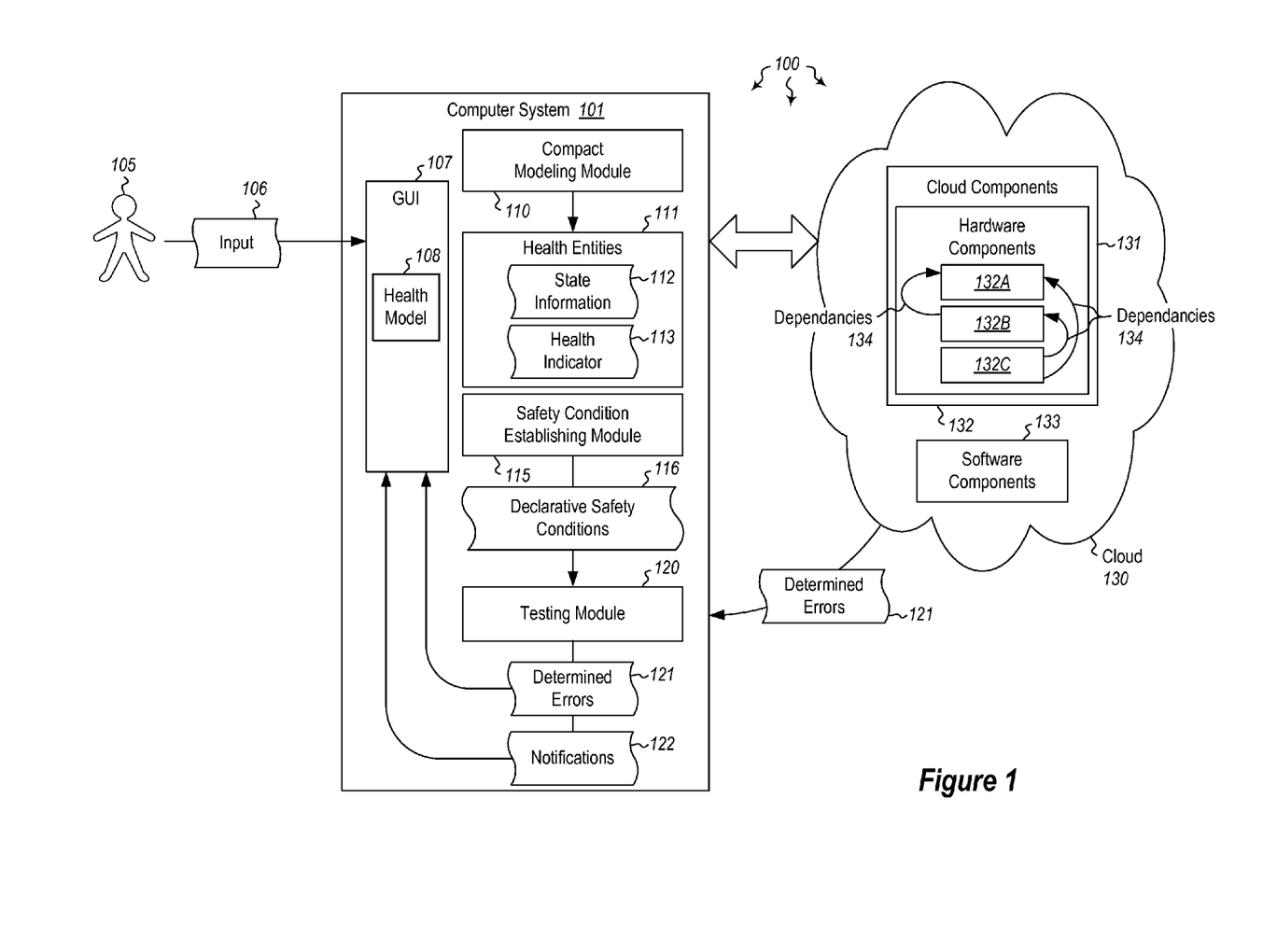
FIG. 1 illustrates a computer architecture in which embodiments described herein may operate including establishing a model for testing cloud components and preventing cascading failures in cloud components.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. Each of these modules may be a part of computer system 101, or may be a part of any of the computer systems in cloud 130. Indeed, computer system 101 may be part of cloud 130 or part of some other public or private cloud.

In cloud 130 and in other large scale distributed systems, many different cloud components 131 may be used to process distributed applications, including hardware components 132 and software components 133. These components work together to enable the running applications on blades (or other server computer systems) in the cloud. Any of these components can fail, and for a variety of different reasons: configuration problems, mismatched versions, bugs, hardware issues, race conditions, operator error, malicious attacks, failure cascades, and others. As such, many different failures can cause the customer to not see his application running. The failures may occur at the VM level, at the hardware node level, at the cluster level, at the datacenter level and at the cloud level. Hardware errors may include not only errors in the processor(s) and/or memory, but also in the networking subsystem. Routers, switches or other network hardware may be not be functioning properly due to hardware or misconfiguration issues, or there may be issues in networking software leading to other failures.

These hardware and software failures can be masked or hidden from users if sufficient redundancy is in place. Sufficient redundancy allows the cloud 130 to provide high availability despite hardware/software failures. For instance, if a node is not responding or not finishing its work within a desired amount of time, a new blade may be chosen instead of the old one. While such recovery actions done sparingly work well, performing too many of them may lead to cascading failures due to capacity overruns or other problems.

Embodiments designed to provide sufficient redundancy in a cloud computing system may implement a mechanism that localizes and isolates faults quickly, takes "safe" recovery actions, and uses cloud scale and redundancy to overcome software/hardware failures. The mechanism identifies the root problem and takes appropriate action. To do this, a component modeling module 110 establishes a health model 108 for each of the cloud components. The health model is aware of the global health of the cloud. As the term is used herein, a component's "health" refers to whether the node is running and functioning properly. A health component is thus functioning properly, while an unhealthy node is problematic in some fashion.

In embodiments described herein, a health status may be determined and/or monitored for each cloud component 131. The health status includes various information including any of the following: the name of the component, its current state 112, a health indicator 113 (that indicates how close a component is to being unhealthy), dependency information (i.e. what other components it depends upon, parent component, etc.) and declarative safety conditions 116 (i.e. a declarative specification of the safety property for that component (which may have an associated knob that can be controlled to control the behavior of that condition)). Example declarative safety conditions may include specifying that the number of unhealthy nodes is to remain less than 50 (where the number may be changed by using a knob in GUI 107). The health status may further include recent events including a cached copy of recent activity for that component, as well as recent issues which includes a cached copy of recent errors, warnings, exceptions, etc.

Each component includes a set of safety conditions 116. Safety conditions declaratively express what it means for the component to be healthy. For example, the availability component can be defined as healthy when all the customers running in a specified cluster are "available". These conditions are typically simple, and specified as a description of what is to occur (or not occur), with various controls that modify the behavior. For example, a declarative safety condition may specify that at any time, no more than 5% (adjustable) of the nodes should be powered off; or, at any time, no more than 5% (adjustable) of the nodes should be in a booting or powering on state.

A guarded interface may be provided that uses the health of the component to determine if a particular recovery action should be allowed or not. These actions may be responses that are normally taken to resolve a failure (e.g. reboot or power down a failed node). A guarded interface may be implemented to prevent nodes from performing recovery actions that may have deleterious effects on other nodes. For instance, hardware (or software) components may be dependent on each other. If one component is rebooted or powered down, and other nodes are dependent on that node, a cascading failure may occur. For example, in hardware components 132A, 132B and 132C may be interdependent. As shown in FIG. 1, hardware component 132B is dependent on component 132A, and component 132C is dependent on both components 132A and 132B. (It should be noted that hardware components may also be dependent on software components, and vice versa). Thus, if component 132A were to be rebooted as a result of a fault, the guarded interface may prevent that action from occurring. As such, dependencies 134 between components may be taken into account when determining whether a recovery action is allowed to take place.

In some cases, a guarded interface may be implemented to prevent one or more cloud nodes from rebooting at the same time. In the above example, where the declarative safety condition specified that at any time, no more than 5% (adjustable) of the nodes should be powered off, the guarded interface may ensure that only 5% (or fewer) of the nodes are power cycled at any given time. The guarded interface thus allows the cloud to maintain its reliability, while still allowing any (complicated) logic outside to suggest actions that the outside logic thinks are good for the system. Thus, complex automations can be written the core component and iterated upon quickly while the core of the system will provide reliability using guarded interfaces and safety conditions.

Safety conditions may also be used in combination with the dependencies 134 discussed above. For instance, if a safety condition indicates that it is currently ok to power cycle hardware component 132A (i.e. the safety condition is currently being met), but the component's dependencies indicate that power cycling the node would cause a cascading (or other) failure, the power cycling action may be postponed terminated. Safety conditions and component interdependencies can thus associate semantic meaning to the raw health data for each hardware and/or software component. Thus, in cases where the raw health data is represented by a number or a state vector, the semantic meaning may add additional information that can be used in determining whether a recovery action is to be taken.

When the guarded interface prevents an action, it not only returns which component, but which exact safety condition failed and the control(s) controlling it (if any). This provides an external operator (e.g. user 105) a large amount of information regarding why the action was denied and which knob controls it. This aids in localizing failures, as the root cause is provided as well as the reason for its failure. This allows a user or cloud manager to quickly understanding which component is failing. If the component is failing with some error, the recent events and issues give a quick insight into the component's inner working. Still further, when a component fails, the failure may be localized and isolated. Any components that depend on the failed component to be healthy point to that component as the reason they are not healthy. This provides helpful information for tracking errors in real-time, as well as providing precise error information in the GUI 107. This error information may be used to quickly resolve issues with faulty cloud components. These concepts will be explained further below with regard to methods 200 and 300 of FIGS. 2 and 3, respectively.

Figure 2:
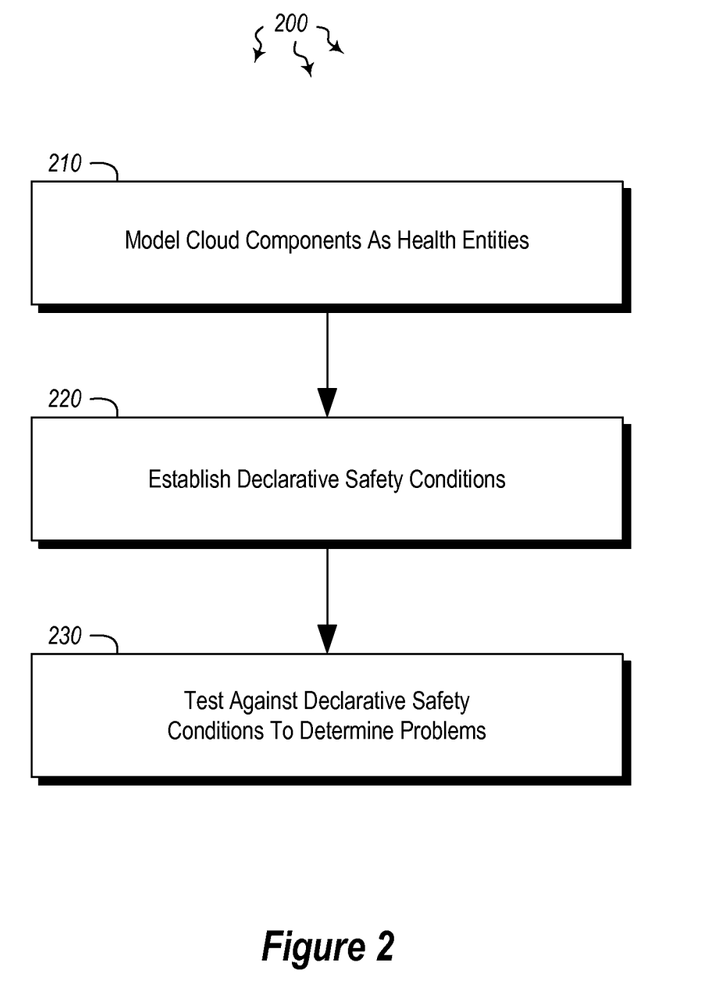
FIG. 2 illustrates a flowchart of an example method for establishing a model for testing cloud components.
Figure 3:
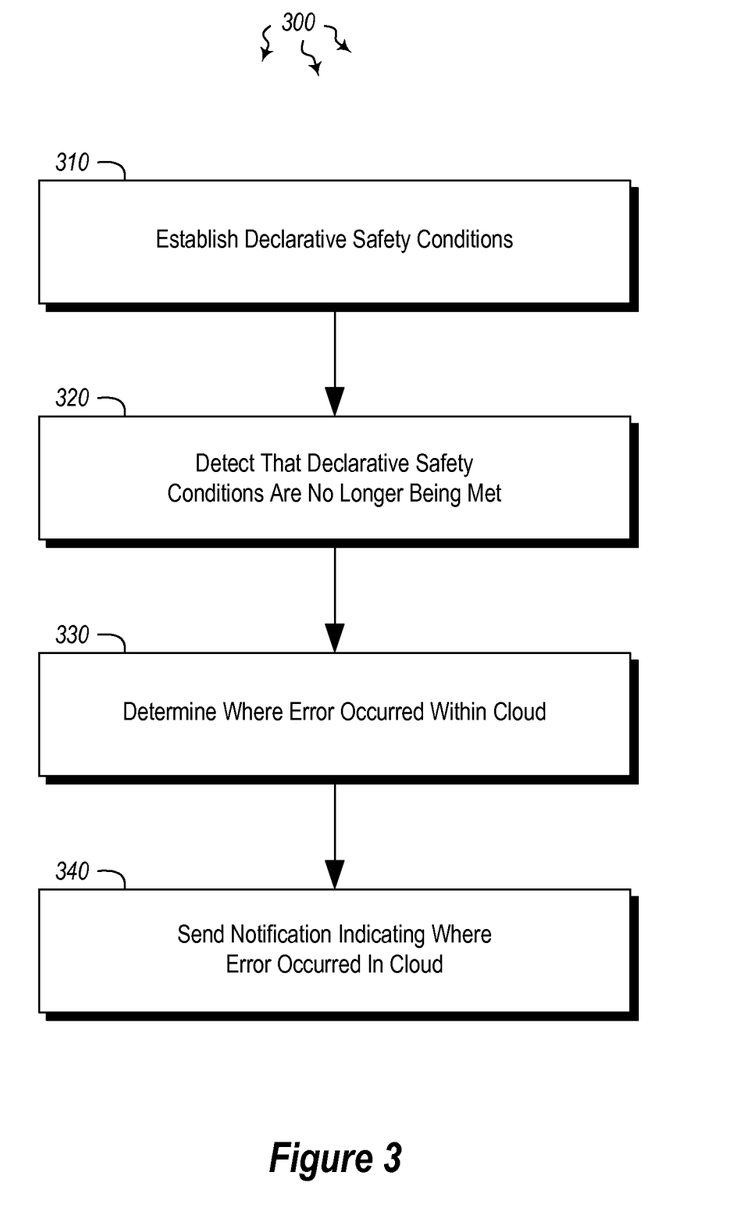
FIG. 3 illustrates a flowchart of an example method for preventing cascading failures in cloud components.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing a model for testing cloud components. The method 200 will now be described with frequent reference to the components and data of environments 100 of FIG. 1, as well as the embodiments shown in FIGS. 4A and 4B.

Method 200 includes an act of modeling one or more identified cloud components including at least one of cloud hardware components and cloud software components as health entities, wherein the health entities are configured to provide state information about the cloud component (act 210). For example, component modeling module 110 may model cloud components 131 as health entities 111. Each health entity includes state information 112 about that component. As indicated above, hardware components 132 may include any type of hardware including processors, memory, hard drives, networking hardware or other hardware. Software components 133 may include software functions, applications, modules, virtual machines or any other portion of software.

Figure 4A:
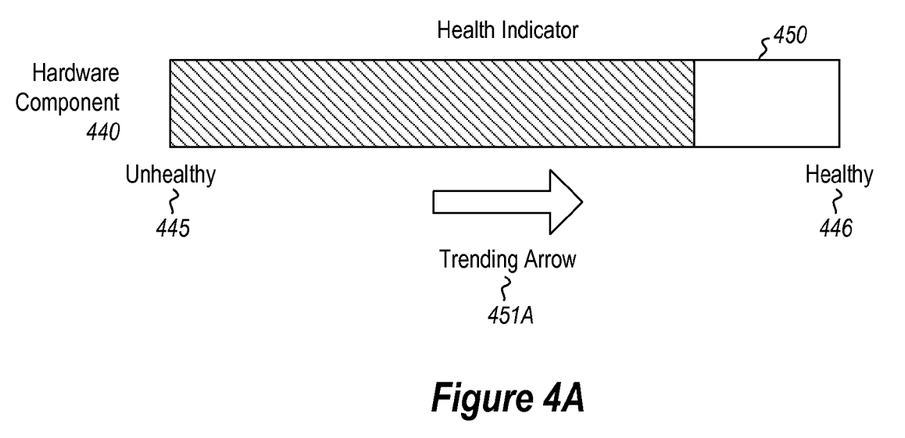
FIGS. 4A and 4B illustrate embodiments of health indicators and trending arrows showing the trend of errors in cloud components.
Figure 4B:
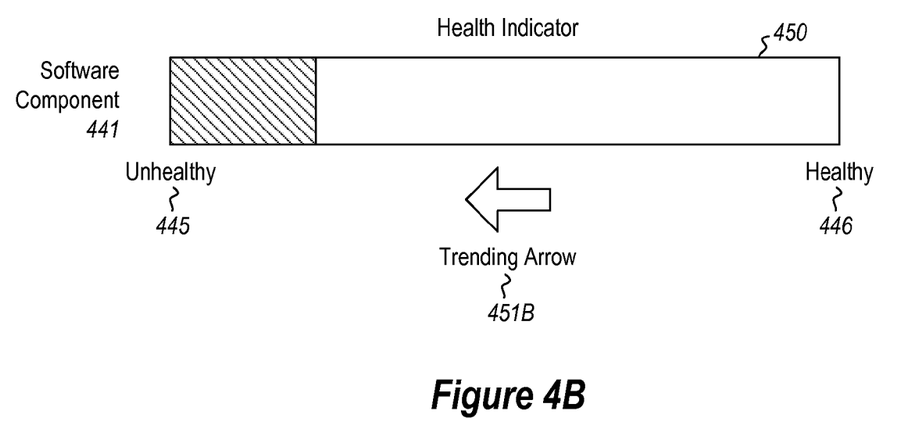

The state information 112 may include any of the following: an indication of the last time the component was updated, an indication of recent computing events, an indication of recent computing errors, or an indication of component dependencies. The state information may form the basis of a health indicator 113. As shown in FIGS. 4A and 4B, the health indicator 450 indicates each component's current health. For example, in FIG. 4A, the bar indicates that hardware node 440 is approximately 75% healthy. The trending arrow 451A may indicate which direction the component's health is trending (in this case, the component is trending toward an increase in health.

Various errors or malfunctions may cause a component's health to rise or fall. A component that has experienced no errors or only minor errors may be indicated as being substantially healthy 446, while a component that is completely unresponsive or is producing major errors will be indicated as being unhealthy 445. As such, it can be seen that software node 441 is only about 20% healthy, and its health is trending down according to the trending arrow 451B. In some cases, the length of the trending arrow may indicate how long it has been trending in that direction. As such, trending arrow 451A shows that hardware component 440 has been trending up in health for a longer length of time, while trending arrow 451B shows that software component 441 has been trending down for only a short period of time. Health indicators may be applied at each level of cloud 130. Accordingly, health indicators may be applied to each hardware and software component, each cluster, each datacenter and each cloud. Trending arrows may be provided at each level showing which direction each component, cluster, datacenter and cloud is trending health-wise. The health model 108 created by the component modeling module 110 may be thus show, for each hierarchical level, that level's current state and the direction the level is heading.

Method 200 also includes an act of establishing one or more declarative safety conditions which declaratively describe cloud computing conditions that are to be maintained at the identified cloud components (act 220). safety condition establishing module 115 may establish declarative safety conditions 116 that are to be maintained at each cloud component. As mentioned above, these conditions may generally state what is to occur (or not occur) with regard to a specific component, or at a specific hierarchical level. For example, a declarative safety condition may indicate that less than a computing node can use no more than 10% of the available network bandwidth. Additionally or alternatively, a declarative safety condition may indicate that a given cluster can have no more than 3% of computing systems powered off at any given time. These are, of course, only examples of the many different declarative safety conditions that may be used or specified by a user (e.g. user 105 using input 106). The values specified by these declarative safety conditions may be adjusted using GUI 107 with knobs or other controls.

Method 200 further includes an act of testing against at least one of the one or more declarative safety conditions to determine which cloud components are or are becoming problematic (act 230). Testing module 120 may be used to test declarative safety conditions 116 at various nodes, clusters, data centers and/or clouds. If the declarative safety conditions are not being met, then it is very likely that errors are occurring at one or more levels in the hierarchy. The GUI 107 may present a graphical representation of the health model 108, including the cloud components 131 at each hierarchical level. The graphical representation may show a health indicator 113 for each cloud component, and may further show state information 112 for each of the modeled health entities.

The GUI may further identify cloud component problems (e.g. errors 121) using the graphical representation of the GUI health model GUI. The error may be shown adjacent to a component in the GUI, specifying which error occurred and which component the error occurred at. The errors may be identified by and received from a user (e.g. 105) or from any of the cloud components 132/133. Any identified problems may be mapped to known, potential failures that show symptoms similar to those occurring at the problematic node. These known, potential failures may be used to diagnose and fix the errors. Any identified problems may be further mapped to one or more of the most likely cloud components to experience that failure. The GUI 107 may show each of these mappings, and may include color-coded controls for each cloud component, at each of the cloud's hierarchical levels.

FIG. 3 illustrates a flowchart of a method 300 for preventing cascading failures in cloud components. The method 300 will now be described with frequent reference to the components and data of environment 100.

Method 300 includes an act of establishing one or more declarative safety conditions which declaratively describe cloud computing conditions that are to be maintained at one or more cloud components including at least one of hardware components and software components (act 310). For example, safety condition establishing module 115 may establish declarative safety conditions 116 that are to be maintained for hardware 132 and software components 133 of cloud 130. The testing module 120 may detect that any one or more of the declarative safety conditions is no longer being met, indicating that an error has occurred at one or more components of a specified cloud (act 320). The error may be unknown, but a list of potential errors may be provided to the user in notification 122.

Health indicators 113 may also be used to shown how the health of a given component is trending. Thus, the health indicator may be used to identify cloud components that are near failure. For instance, as shown in FIG. 4B, software component 441 is very unhealthy and is near failure. Moreover, trending arrow 451B indicates that the health is not improving, and is getting worse. If the health indicator reaches a specified level at an identified component, error detection may be automatically initiated to determine the error at the identified component.

Method 300 then includes an act of determining, based on which safety condition is no longer being met, where the error occurred within the specified cloud (act 330). The computer system 101 may determine, for example, that declarative safety condition 116 is no longer being met for a specified component. The computer system 101 may then send notification 122 to user 105 indicating that the error occurred, and further indicating the cloud component at which the error occurred (act 340). The notification 122 may be automatically sent to other nodes in the cloud identifying that the node that experienced the error. Thus, each other component or node may be notified where the error occurred.

As mentioned above, guarded interfaces may be provided to prevent failures caused from taking action to resolve the first error. For instance, if it was determined that various declarative safety conditions were no longer being met, and that one or more errors had occurred, a natural management action may be to power down the nodes that are causing the errors. However, guarded interfaces may prevent major actions (e.g. a reboot) from taking place if too many other nodes are currently being rebooted (or have been powered off or are in an unresponsive state). Accordingly, the guarded interfaces take into account the other actions that have taken place in the (recent) past and either allow or disallow reparatory actions to take place.

Users may define their own customized guarded interfaces. These may be customized per component, and may be implemented for hardware components 132 and/or software components 133. Thus, as with the example above, if it is determined that a declarative safety condition is no longer being met, and specified, automatic action is to be taken to remedy the error (e.g. migrate a virtual machine to another node), that action may be allowed or prevented by the customized guarded interfaces. Guarded interfaces may prevent automatic actions or actions directly input by the user 105. Thus, for example, if a user indicated that a particular node was to be rebooted, or isolated from the network, or was to implement major software changes as a result of an error, the guarded interface would prevent that action if a sufficient number of similar actions had already taken place.

If a guarded interface determines that a proposed (automatic or user-initiated) action is allowable, then the action may be performed. Then, for instance, if the action is to power off the node, or isolate the node from the network, the declarative safety conditions and guarded interface may be consulted to determine when to power the node back on, or restore network connectivity to the node.

Accordingly, methods, systems and computer program products are provided which establish a model for testing cloud components, including both hardware and software components. Moreover, methods, systems and computer program products are provided which prevent cascading failures in cloud components by using declarative safety conditions and guarded interfaces to ensure that certain conditions are met, and that actions taken to fix problems do not, themselves, create additional, cascading problems.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
   one or more processors;
   system memory;
   one or more computer-readable storage media having stored thereon computer-executable instructions that, when executed by the one or more processors, causes the computing system to perform a method for establishing a model for testing cloud components, the method comprising the following:
      an act of modeling one or more identified cloud components including at least one of cloud hardware components and cloud software components as health entities, wherein the health entities are configured to provide state information about the cloud component;
      an act of establishing one or more declarative safety conditions which declaratively describe cloud computing conditions that are to be maintained at the identified cloud components;
      an act of testing against at least one of the one or more declarative safety conditions to determine which cloud components are or are becoming problematic; and
      an act of presenting a user interface with a health indicator comprising an arrow that points in specific direction to reflect a health trend associated with the corresponding one of the cloud components and wherein the arrow has a size that is increased or decreased to reflect a relative amount of time associated with the health trend of the corresponding one of the cloud components.

2. The computer system of claim 1, wherein the state information comprises one or more of the following: an indication of the last time the one of the cloud components was updated, an indication of recent computing events, an indication of recent computing errors, and an indication of component dependencies.

3. The computer system of claim 1, wherein the health indicator further includes a health bar that reflects a relative magnitude of total health of the corresponding one of the components.

4. The computer system of claim 1, wherein the modeling results in a health model for cloud management components that manage cloud hardware.

5. The computer system of claim 4, wherein the health model identifies the health of cloud components at a plurality of hierarchical levels including a cluster level, a data center level and a cloud level.

6. The computer system of claim 5, further comprising presenting a graphical representation of the health model, including one or more of the cloud components at each hierarchical level.

7. The computer system of claim 6, further comprising identifying one or more cloud component problems using the graphical representation of the health model.

8. The computer system of claim 7, wherein the identified problem is mapped to one or more known, potential failures.

9. The computer system of claim 8, wherein the identified problem is further mapped to one or more of the most likely cloud components to experience that failure.

10. The computer system of claim 7, wherein the includes one or more controls for each cloud component, at each of the hierarchical levels.

11. A computer system comprising the following:
one or more processors;
system memory;
one or more computer-readable storage media having stored thereon computer-executable instructions that, when executed by the one or more processors, causes the computing system to perform a method for preventing cascading failures in cloud components, the method comprising the following:
an act of establishing one or more declarative safety conditions which declaratively describe cloud computing conditions that are to be maintained at one or more cloud components including at least one of hardware components and software components;
an act of detecting that at least one of the declarative safety conditions is no longer being met, indicating that an error has occurred at one or more components of a specified cloud;
an act of determining, based on which safety condition is no longer being met, where the error occurred within the specified cloud;
an act of presenting an arrow that points in a specific direction to reflect a health trend associated with the one or more components and wherein the arrow has a size that is increased or decreased to reflect a relative amount of time associated with the health trend of the corresponding one or more components; and
an act if providing a guarded interface that is configured to prevent a recovery action to correct the error from being performed based on detected dependency information, such that the guarded interface is designed to prevent the recovery action from being performed on a first set of one or more components in response to determining that a second set of one or more components depend on the first set of the one or more components associated with the error.

12. The computer system of claim 11, wherein a notification is automatically sent to other nodes in the cloud identifying the one or more cloud components that experienced an error.

13. The computer system of claim 11, wherein each cloud component includes a health indicator that indicates the trending health for each corresponding cloud component.

14. The computer system of claim 13, wherein the health indicator is used to identify at least one of the one or more cloud components that is near failure.

15. The computer system of claim 14, wherein if the health indicator reaches a specified level at an identified component, error detection is automatically initiated to determine the error occurred at the identified component.

16. A computer system comprising the following:
one or more processors;
system memory;
one or more computer-readable storage media having stored thereon computer-executable instructions that, when executed by the one or more processors, causes the computing system to perform a method for establishing a model for testing cloud components, the method comprising the following:
an act of modeling one or more identified cloud components including at least one of cloud hardware components and cloud software components as health entities, wherein the health entities are configured to provide state information about the cloud component, the modeling resulting in a health model for cloud management components that manage cloud hardware, the health model identifying the health of cloud components at a plurality of hierarchical levels including a cluster level, a data center level and a cloud level;
an act of establishing one or more declarative safety conditions which declaratively describe cloud computing conditions that are to be maintained at the identified cloud components;
an act of testing against at least one of the one or more declarative safety conditions to determine which cloud components are or are becoming problematic; and
an act of presenting a graphical user interface (GUI) that shows a health indicator comprising a graphical representation of a health status of at least some of the one or more of the cloud components at each hierarchical level, the health indicator comprising:
a health bar that reflects a relative magnitude of total health associated with a corresponding one of the cloud components, and
an arrow that points in a specific direction to reflect a health trend associated with the corresponding one of the cloud components and wherein the arrow has a size that is increased or decreased to dynamically reflect a relative amount of time associated with the health trend.

* * * * *